(12) United States Patent
Takahashi

(10) Patent No.: US 11,325,332 B2
(45) Date of Patent: May 10, 2022

(54) ATTACHING DEVICE AND METHOD FOR ATTACHING BAND-LIKE MEMBER TO TIRE INNER SURFACE

(71) Applicant: The Yokohama Rubber Co., LTD., Tokyo (JP)

(72) Inventor: Yukihisa Takahashi, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 17/255,418

(22) PCT Filed: Mar. 29, 2019

(86) PCT No.: PCT/JP2019/014109
§ 371 (c)(1),
(2) Date: Dec. 22, 2020

(87) PCT Pub. No.: WO2020/003672
PCT Pub. Date: Jan. 2, 2020

(65) Prior Publication Data
US 2021/0276292 A1    Sep. 9, 2021

(30) Foreign Application Priority Data
Jun. 25, 2018    (JP) .............................. JP2018-119898

(51) Int. Cl.
*B29D 30/06* (2006.01)
*B60C 19/00* (2006.01)

(52) U.S. Cl.
CPC ........ *B29D 30/0681* (2013.01); *B60C 19/002* (2013.01); *B29D 2030/0682* (2013.01)

(58) Field of Classification Search
CPC ........ B29D 30/0685; B29D 2030/0072; B29D 2030/0682; B29D 2030/0683;
(Continued)

(56) References Cited

U.S. PATENT DOCUMENTS

| 2017/0144394 A1 | 5/2017 | Denavit et al. |
| 2017/0225417 A1 | 8/2017 | Puppi et al. |
| 2017/0348929 A1 | 12/2017 | Badaroux |

FOREIGN PATENT DOCUMENTS

| CN | 107471663 | 12/2017 |
| JP | 2007-168243 | 7/2007 |

(Continued)

OTHER PUBLICATIONS

Satoshi Kanzawa, JP-2009248450-A, updated machine translation. (Year: 2009).*

(Continued)

*Primary Examiner* — Robert C Dye
*Assistant Examiner* — Sedef E Paquette
(74) *Attorney, Agent, or Firm* — Thorpe North & Western

(57) ABSTRACT

Provided is an attaching device and a method for attaching a band-like member to a tire inner surface. A holder that holds the band-like member in a wound state and a paddle are disposed in an inner portion of a tire, and a dispensed portion is pressure-bonded to the inner surface by repeatedly performing: a bonding operation in which a predetermined length dispensed from the band-like member in a wound state toward the inner surface is pressed, by moving the paddle close to the inner surface with no relative rotation of the tire in the circumferential direction with respect to the holder, and is pressure-bonded to the inner surface and a dispensing operation in which, after the bonding operation, the paddle is moved away from the inner surface, and together with relatively rotating the tire in the circumferential direction, a new dispensed portion is formed.

8 Claims, 10 Drawing Sheets

(58) Field of Classification Search
CPC ...... B29D 2030/0686; B29D 2030/069; B29D 2030/0691; B29D 2030/0694; B29D 2030/0695; B29D 2030/487; B60C 19/12
USPC .............................................. 156/110.1, 117
See application file for complete search history.

(56) References Cited

FOREIGN PATENT DOCUMENTS

| | | |
|---|---|---|
| JP | 2009-248450 | 10/2009 |
| JP | 2017-520461 | 7/2017 |
| JP | 2017-537010 | 12/2017 |
| KR | 10-2010-0043653 | 4/2010 |
| WO | WO 2016/001259 | 1/2016 |
| WO | WO 2016/067192 | 5/2016 |
| WO | WO 2016/087786 | 6/2016 |
| WO | WO 2018/079247 | 5/2018 |

OTHER PUBLICATIONS

Kiyoshi Haba, JP-2007168243-A, machine translation. (Year: 2007).*
International Search Report for International Application No. PCT/JP2019/014109 dated Jun. 4, 2019, 4 pages, Japan.

* cited by examiner

ATTACHING DEVICE AND METHOD FOR ATTACHING BAND-LIKE MEMBER TO TIRE INNER SURFACE

TECHNICAL FIELD

The present technology relates to an attaching device and a method for attaching a band-like member to a tire inner surface of a tire and more particularly relates to an attaching device and a method for securely and firmly attaching a band-like member such as a sound absorbing member to the tire inner surface.

BACKGROUND ART

In pneumatic tires, cavernous resonance caused by the vibration of the air inside the tire is one cause of tire noise. This cavernous resonance is generated when a tread portion vibrates due to unevenness of a road surface when the tire rolls, and the vibration of the tread portion vibrates the air inside the tire. As a measure for reducing such noise, a band-like sound absorbing member made of a porous material is attached to the tire inner surface in a tire circumferential direction (see, for example, Japan Unexamined Patent Publication No. 2007-168243).

In the method and device for applying a band-like sponge member (sound absorbing member) described in Japan Unexamined Patent Publication No. 2007-168243, a wound body, formed by spirally winding the band-like sponge member cut in advance to the attachment length, is attached to a sponge holding frame. Then, the tire is rotated with one end of the band-like sponge member attached to the tread inner surface, and the band-like sponge member is sequentially removed from the sponge holding frame and attached to the tread inner surface by an attaching roller. The attaching roller is pressed against the band-like sponge member while being rolled, so when the pressing force is increased, an extra tensile force is applied to the band-like sponge member, and the band-like sponge member is easily broken. Therefore, this is a disadvantageous method for strongly pressing the band-like sponge member with the attaching roller, and there is room for improvement in order to firmly attaching the band-like sponge member to the tread inner surface.

SUMMARY

The present technology provides an attaching device and method for attaching a band-like member capable of securely and firmly attaching a band-like member such as a sound absorbing member or the like to a tire inner surface.

The attaching device for attaching a band-like member to a tire inner surface of an embodiment of the present technology is an attaching device for attaching a band-like member to an inner surface of a tire that includes:

a holder for holding the band-like member in a wound state;

a support arm for disposing this holder inside the tire;

a paddle that is disposed in an inner portion of the tire and that is configured to move toward or away from the inner surface;

a delivery-driving unit configured to dispense the band-like member held by the holder toward the inner surface; and a rotation driving unit configured to relatively rotate the tire in a tire circumferential direction with respect to the holder disposed in the inner portion of the tire, and the dispensed portion sequentially dispensed and having a predetermined length is pressure-bonded to the inner surface by repeatedly performing:

a bonding operation in which a dispensed portion of a predetermined length that is dispensed from the band-like member in a wound state toward the inner surface by the delivery-driving unit is pressed, by moving the paddle close to the inner surface in a state in which a relative rotation of the tire in the tire circumferential direction with respect to the holder is stopped, and is pressure-bonded to the inner surface and a dispensing operation in which, after the bonding operation, the paddle is moved away from the inner surface, and together with relatively rotating the tire in the tire circumferential direction with respect to the holder by the rotation-driving unit, a new dispensed portion having a predetermined length and dispensed by the delivery-driving unit from the band-like member in a wound state toward the inner surface is formed.

The method for attaching a band-like member to a tire inner surface according to an embodiment of the present technology is a method for attaching a band-like member to a tire inner surface, the method attaching a band-like member to an inner surface of a tire by:

disposing a holder that holds the band-like member in a wound state and a paddle that moves toward or away from the inner surface inside the tire; and pressure-bonding a dispensed portion sequentially dispensed and having a predetermined length to the inner surface by repeatedly performing:

a bonding operation in which a dispensed portion of a predetermined length that is dispensed from the band-like member in a wound state toward the inner surface is pressed, by moving the paddle close to the inner surface in a state in which a relative rotation of the tire in a tire circumferential direction with respect to the holder disposed in an inner portion of the tire is stopped, and is pressure-bonded to the inner surface and a dispensing operation in which, after the bonding operation, the paddle is moved away from the inner surface, and together with relatively rotating the tire in the tire circumferential direction with respect to the holder, a new dispensed portion having a predetermined length and dispensed from the band-like member in a wound state toward the inner surface is formed.

According to an embodiment of the present technology, the bonding operation and the dispensing operation are alternately repeated, and in the bonding operation, a dispensed portion of a predetermined length that is dispensed from the band-like member in a wound state toward the inner surface is pressed, by the paddle in a state in which a relative rotation of the tire in the tire circumferential direction with respect to the holder disposed in the inner portion of the tire is stopped and is pressure-bonded to the inner surface, so the dispensed portion may be pressed sufficiently without applying an extra tensile force. In the dispensing operation, the paddle is moved away from the inner surface, and together with relatively rotating the tire in the tire circumferential direction with respect to the holder, a new dispensed portion having a predetermined length and dispensed from the band-like member in a wound state toward the inner surface is formed, so at the time of this operation, it is possible to avoid applying an extra tensile force to the new dispensed portion. Therefore, the band-like member may be firmly bonded to the inner surface while avoiding damage to the band-like member.

DETAILED DESCRIPTION

Figure 1:
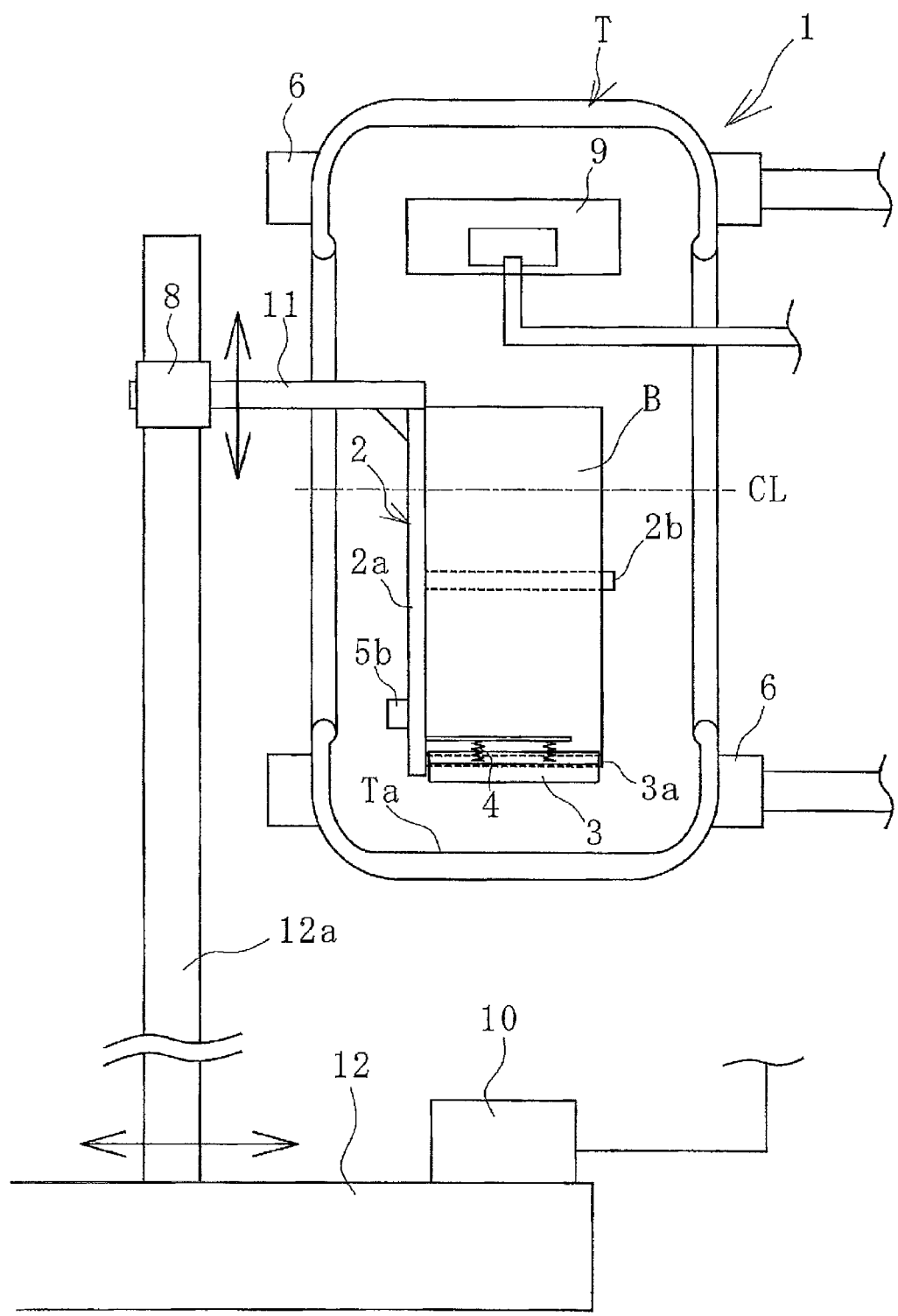
FIG. 1 is an explanatory diagram illustrating an inner portion of a tire in which an attaching device of an embodiment of the present technology is disposed, in a tire front view.

Hereinafter, an attaching device and a method for attaching a band-like member to a tire inner surface according to an embodiment of the present technology will be described based on the embodiments illustrated in the drawings.

Figure 2:
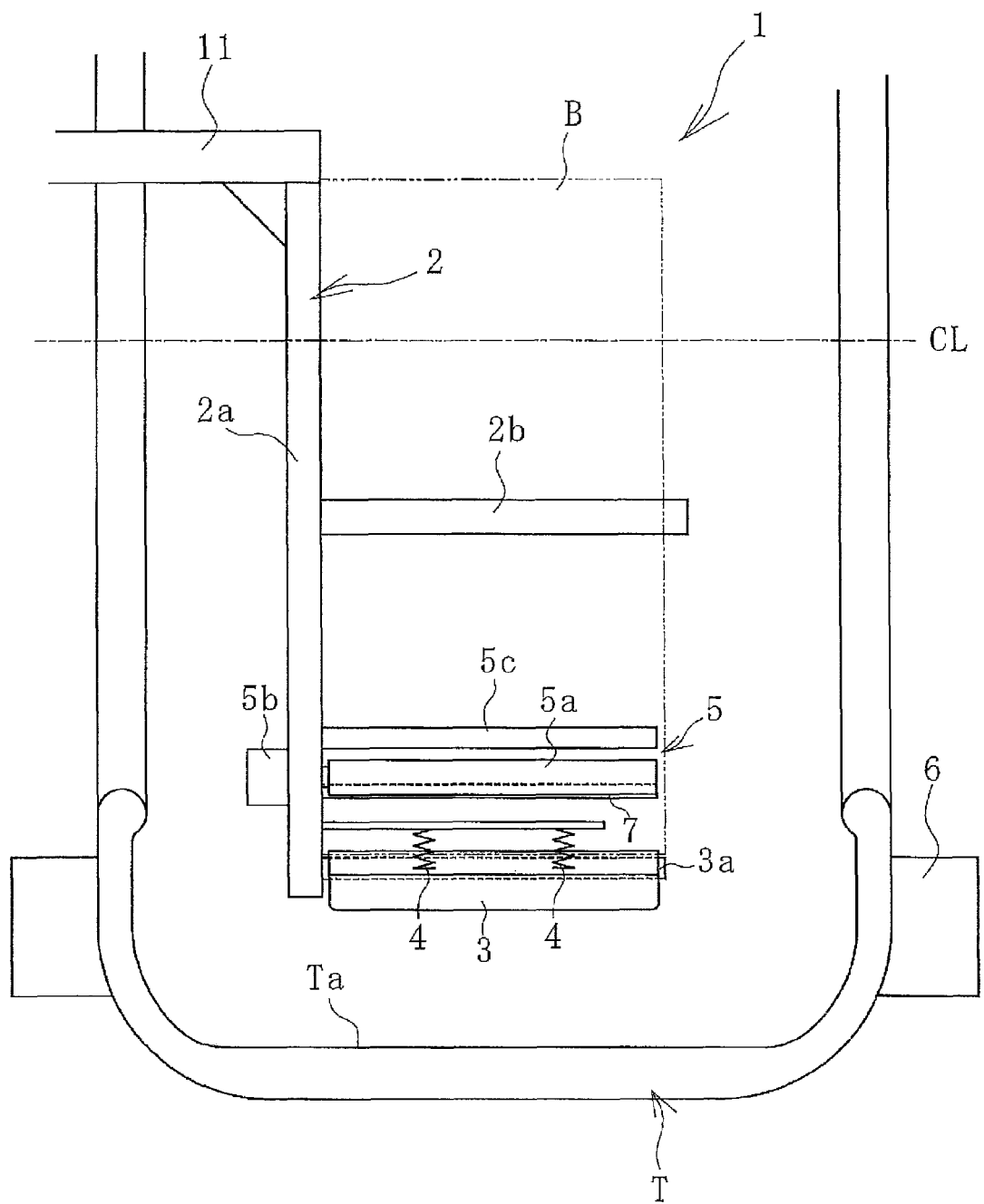
FIG. 2 is a partially enlarged view of FIG. 1.
Figure 3:
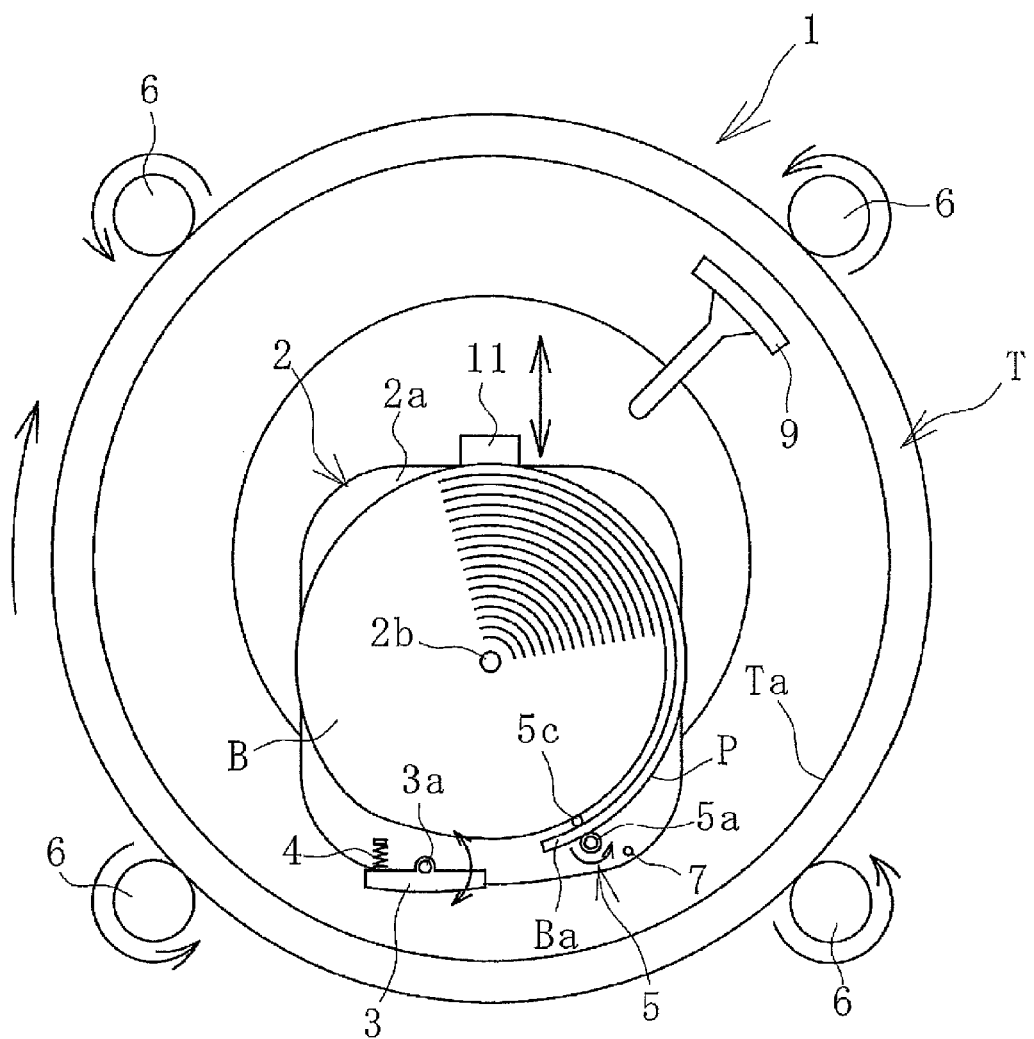
FIG. 3 is an explanatory diagram illustrating the inner portion of the tire in FIG. 1 in a tire side view.

The embodiment of an attaching device 1 for attaching a band-like member to a tire inner surface according to an embodiment of the present technology as illustrated in FIGS. 1 to 3 is used when attaching a band-like member B such as a sound absorbing member or the like to an inner surface Ta of a tire T (hereinafter referred to as the tire inner surface Ta). The tire inner surface Ta is a surface corresponding to an inner circumferential side of a tread surface of the tire T. In this embodiment, an adhering surface disposed on one surface of the band-like member B is covered with release paper P. A dot-dash line CL in the drawings indicates a tire axis of the tire T. In FIG. 2, the band-like member B is indicated by a two-dot chain line.

The attaching device 1 includes: a holder 2 that holds the band-like member in a spirally wound state; a support arm 11 that disposes the holder 2 inside the tire; a paddle 3 disposed inside the tire T; a delivery-driving unit 5 that dispenses the holder 2; a rotation-driving unit 6 for rotating the tire T around a tire axis CL; and a control unit 10 that controls the operation of various parts (mechanisms) that make up the attaching device 1. The attaching device 1 further has a temperature control mechanism 9 for controlling the temperature of the inner surface Ta to be within a predetermined temperature range.

The holder 2 has a holding plate 2a having a disc-shape, and a holding shaft 2b and a paddle shaft 3a are protrudingly provided on one surface of the holding plate 2a. The holding shaft 2b is inserted through the central portion of the band-like member B wound in a spiral shape with the release paper P on an outer circumferential side, whereby the band-like member B in a wound state is rotatably held by the holder 2. The holding plate 2a is further provided with a winding unit 7 for winding up the release paper P that is peeled from the band-like member B.

The support arm 11 is connected to a post 12a that is erected on a base 12 disposed outside the tire T. The post 12a is able to slide in a lateral direction (tire width direction) with respect to the base 12 and is fixed at a desired position. The support arm 11 is able to slide in a vertical direction with respect to the post 12a. In this embodiment, the support arm 11 extending in a direction of the tire axis CL is moved up and down along the post 12a by a movement mechanism 8. As a result of the support arm 11 moving up and down, the holder 2 disposed on an inner side of the tire T moves toward or away from the inner surface Ta. The operation of the movement mechanism 8 is controlled by the control unit 10.

The paddle 3, for example, is a plate-like body having a width dimension equal to or greater than the width of the band-like member B. The surface of the paddle 3 facing the inner surface Ta is preferably a curved surface that conforms to the inner surface Ta.

The paddle shaft 3a is inserted through a hole formed in the paddle 3 so that the paddle 3 is able to rotate about the paddle shaft 3a. The paddle 3 is restrained from pivoting by a biasing member 4 such as a spring that is attached to the holding plate 2 or by a stopper.

The delivery-driving unit 5 dispenses the band-like member B held in a wound state in the holder 2 toward the inner surface Ta. In this embodiment, the delivery-driving unit 5 includes a rotating body 5a having a cylindrical shape and rotatably installed on the holding plate 2a, a drive motor 5b that rotates the rotating body 5a, and a rotating roller 5c disposed on the holding plate 2a, facing the circumferential surface with the rotating body 5a. A dispensed portion Ba dispensed from the band-like member B in the wound state is inserted between the rotating body 5a and the rotating roller 5c. Then, by an outer circumferential surface of the rotating body 5a coming into contact with an outer circumferential surface (release paper P) of the dispensed portion Ba and rotating, the band-like member B is further dispensed by friction between the two. The operation of the delivery-driving unit 5 is controlled by the control unit 10.

In this embodiment, the rotation-driving unit 6 employs a plurality of holding rollers 6 that rotate by coming in contact with the tread surface of the tire T. As long as at least one holding roller 6 is rotationally driven, each and every holding roller 6 may be rotationally driven, or only one holding roller 6 may be rotationally driven. Rotating each holding roller 6 in one direction identically rotates the tire T about the tire axis CL in the other direction. By rotating each holding roller 6 in the other direction identically, the tire T rotates in the one direction about the tire axis CL. The operation of the rotation-driving unit 6 is controlled by the control unit 10.

In this embodiment, a total of four holding rollers 6 are disposed, with two being disposed at two locations on a lower end portion of the tire T in an upright state with a space in a tire circumferential direction, and two being disposed at two locations on an upper end portion of the tire T with a space in the tire circumferential direction. For example, the holding rollers 6 may be disposed at only two locations at the lower end portion of the tire T in an upright state with a space in the tire circumferential direction, and in addition to these two locations, one holding roller 6 may be disposed at the upper end portion of the tire T.

When setting the tire T in the attaching device 1, for example, the two holding rollers 6 at the two locations of the upper end portion of the tire T are retracted to a retraction position. Then, after the tire T is placed on two holding rollers 6 at the two locations of the lower end portion in an upright state, the two holding rollers 6 at the two locations of the upper end portion are moved to a use position, and the tire T is set as illustrated in FIG. 3.

It is sufficient that the rotation-driving unit 6 be able to relatively rotate the tire T in the tire circumferential direction with respect to the holder 2 disposed inside the tire T. Therefore, a mechanism for rotationally moving the holder 2 in the tire circumferential direction with respect to the fixed tire T may be adopted as the rotation-driving unit 6.

The temperature control mechanism 9 adjusts the temperature of the inner surface Ta, for example, to no less than 10° C. and no more than 40° C. As the temperature control mechanism 9, a heater, a blower that generates hot air or cold air, or the like may be used. The temperature control mechanism 9 is controlled by the control unit 10.

Next, the procedure of the method for attaching the band-like member to the inner surface of the tire of an embodiment of the present technology will be described.

In this embodiment, the band-like member B (the dispensed portion Ba) is pressure-bonded to the inner surface Ta at a position in the tire circumferential direction between the two holding rollers 6 disposed at the lower end portion of the tire T illustrated in FIG. 3. The position at which the band-like member B is pressure-bonded to the inner surface Ta is not limited to this position; however, by bonding the band-like member B to the lower end portion of the tire T in the upright state, the band-like member B is more easily pressure-bonded to the inner surface Ta.

First, after establishing a state in which the holding rollers 6 hold the tire T in an upright state as illustrated in FIG. 1, the holder 2 is disposed inside the tire T. The band-shaped member B is held in a wound state in advance by the holder 2. The holder 2 is set so that the holding shaft 2b, the paddle shaft 3a, and the like extend in the direction of the tire axis CL.

Figure 4:
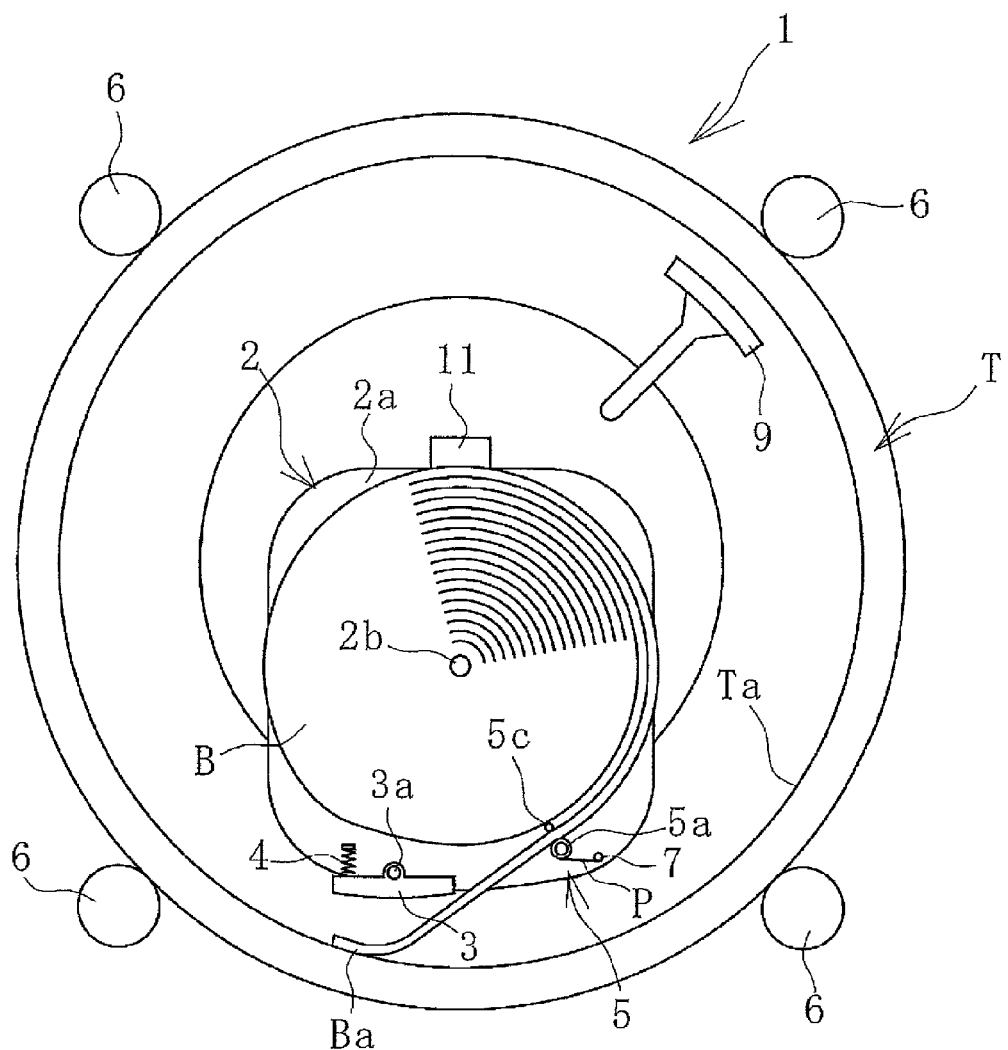
FIG. 4 is an explanatory diagram illustrating a state in which a dispensed portion of the band-like member of FIG. 3 is set on the tire inner surface.

As illustrated in FIG. 3, the dispensed portion Ba is dispensed from the band-shaped member B in the wound state and passed between the rotating body 5a and the rotating roller 5c. Next, as illustrated in FIG. 4, the band-like member B is further dispensed, and a leading edge portion of the peeled release paper P is wound around the winding unit 7. A leading edge portion of the dispensed portion Ba is temporarily bonded to the inside surface Ta. This completes the setting of the dispensed portion Ba. At this time, the holder 2 is positioned at a position (dispensing position) with a certain distance above the inner surface Ta where the dispensed portion Ba will be bonded.

Figure 5:
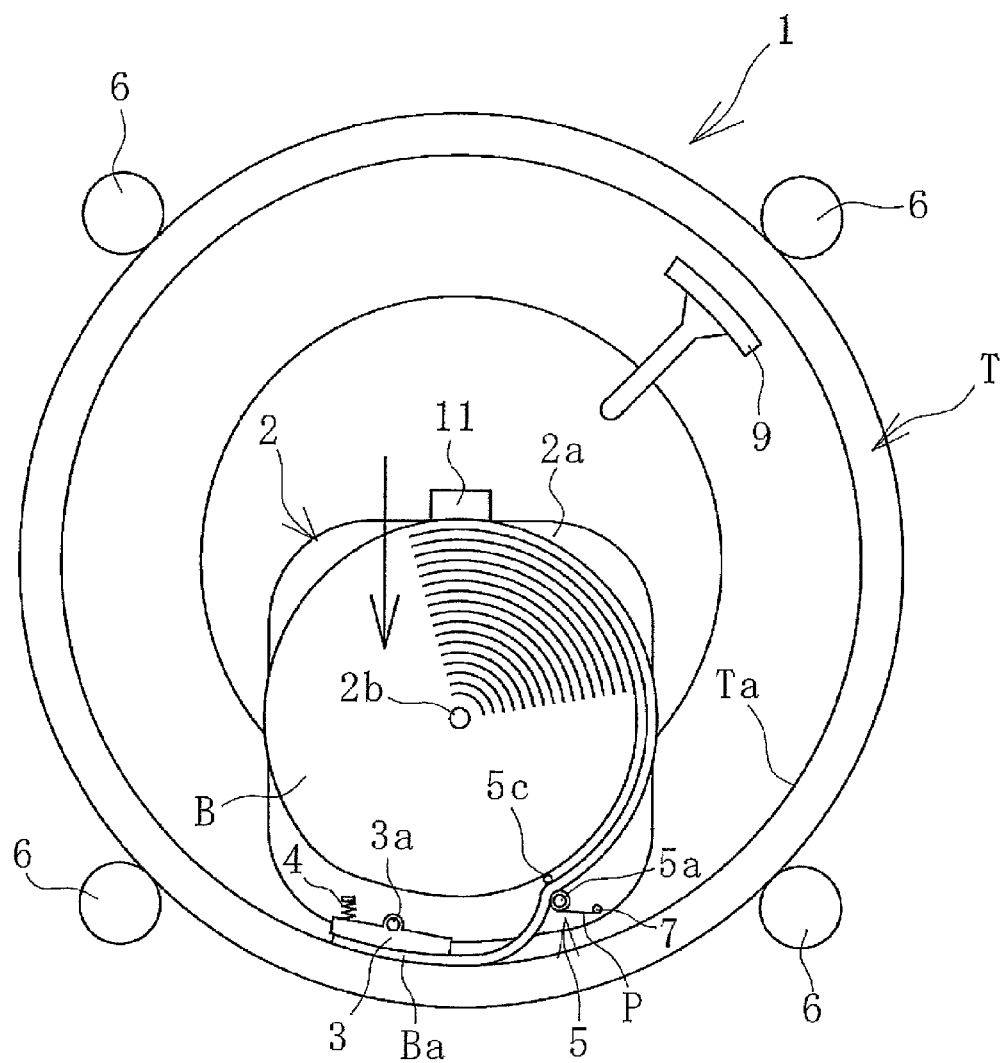
FIG. 5 is an explanatory diagram illustrating a bonding operation performed on the dispensed portion in FIG. 4.

Next, the bonding operation illustrated in FIG. 5 is performed. The bonding operation is performed in a state in which relative rotation of the tire T in the tire circumferential direction with respect to the holder 2 disposed inside the tire T is stopped. In other words, the bonding operation is performed in a state in which the rotation of the holding rollers 6 is stopped. In the bonding operation, the paddle 3 is moved downward to a predetermined bonding position and moved close to the inner surface Ta. As a result, the dispensed portion Ba having a predetermined length which is dispensed from the band-like member B in a wound state toward the inner surface Ta is pressed by the paddle 3 and pressure-bonded to the inner surface Ta. This predetermined bonding position (the vertical position when the paddle 3 moves downward) is preset according to the thickness of the band-like member B and the like.

In this embodiment, the support arm 11 is moved downward by the movement mechanism 8, thereby moving the holder 2 and the paddle 3 together in close proximity to the inner surface Ta. Accordingly, the dispensed portion Ba is pressed strongly toward the inner surface Ta by the paddle 3.

Figure 6:
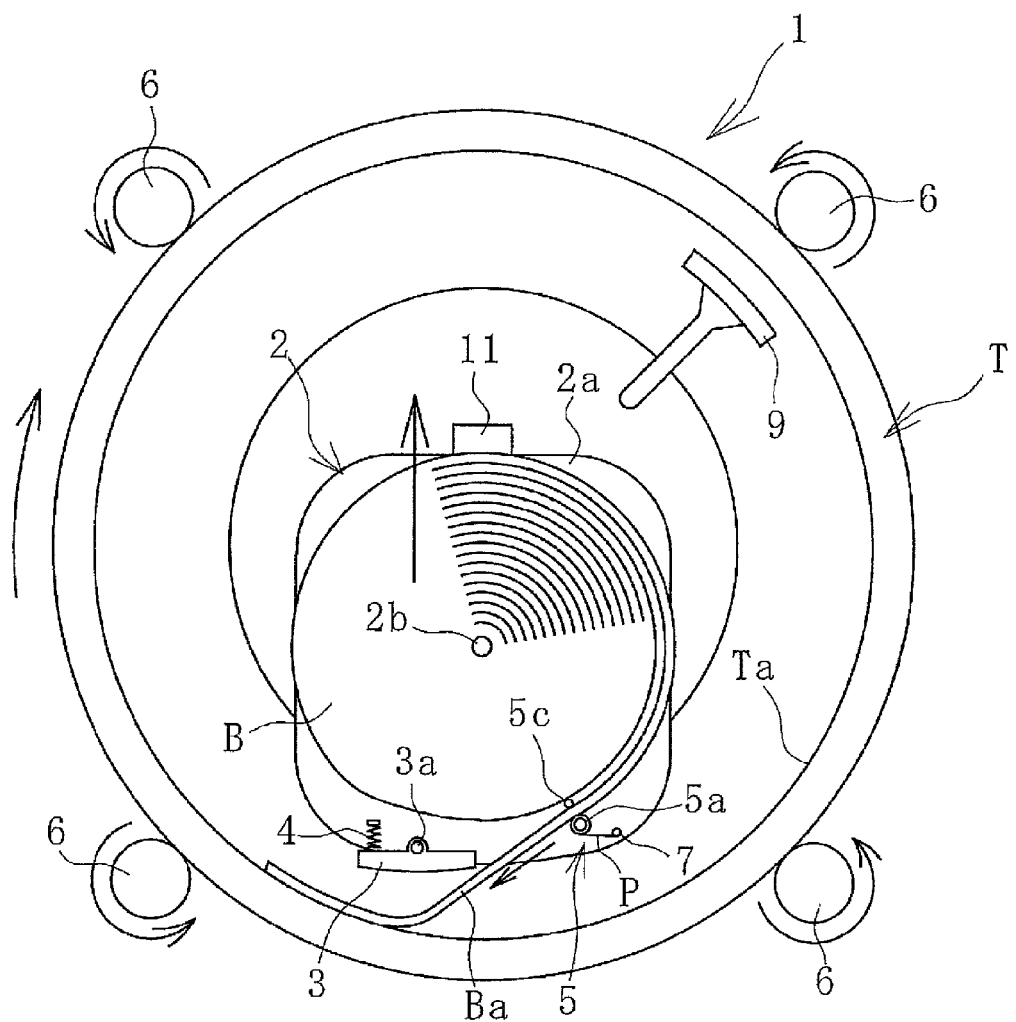
FIG. 6 is an explanatory diagram illustrating a dispensing operation performed after the bonding operation in FIG. 5.

Next, the dispensing operation illustrated in FIG. 6 is performed. In the dispensing operation, the paddle 3 is moved away from the inner surface Ta. In this embodiment, by moving the support arm 11 upward by the movement mechanism 8, the holder 2 and the paddle 3 are integrally moved away from the inner surface Ta. In this way, the holder 2 returns to the dispensing position illustrated in FIG. 3.

Furthermore, in the dispensing operation, the tire T is relatively rotated with respect to the holder 2 in the tire circumferential direction (one direction) and forms a new predetermined length of the dispensed portion Ba dispensed from the band-like member B in the wound state toward the inner surface Ta. In other words, together with rotating the holding rollers 6, the rotating body 5a is rotated to dispense a new predetermined length of the dispensed portion Ba. The predetermined length of the dispenser part Ba is preset and may be adjusted by the operation of the holding rollers 6 and the rotating body 5a. Note that the predetermined length is preferably equal to or less than a length in the tire circumferential direction of a pressing surface of the paddle 3.

Figure 7:
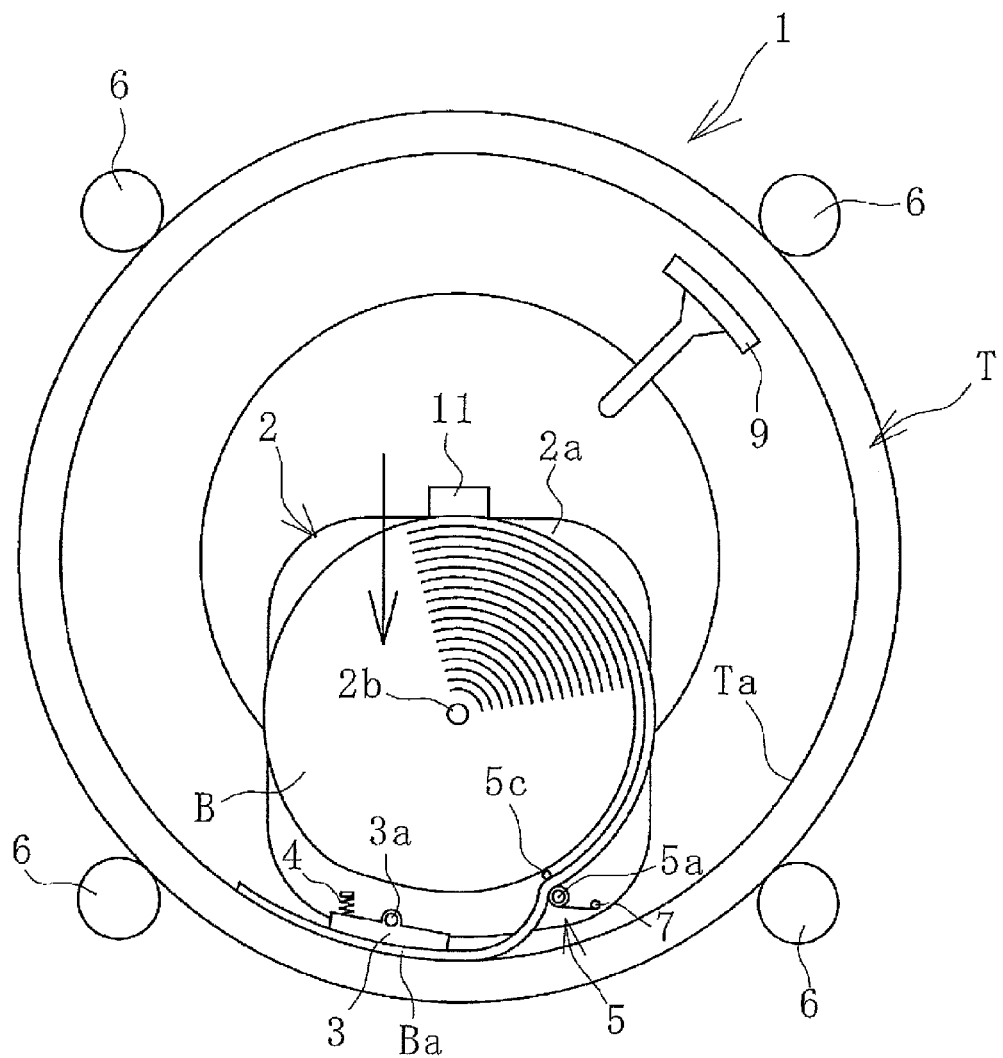
FIG. 7 is an explanatory diagram illustrating a bonding operation performed after the dispensing operation in FIG. 6.

The bonding operation is then performed again as illustrated in FIG. 7. In this way, the bonding operation and the dispensing operation are repeated, and the sequentially dispensed portion Ba having a predetermined length is pressure-bonded to the inner surface Ta. Accordingly, the band-like member B is pressure-bonded to a required range in the tire circumferential direction of the inner surface Ta. By rotating the tire T one time, the band-like member B may be attached to the entire circumference of the tire inner surface Ta.

Thereafter, the band-like member B is cut at a position overlapping an end surface that is the bonding starting point thereof, and the band-like member B held in the holder 2 is separated from the band-like member B attached to the inner surface Ta. A cutting operation of the band-like member B is performed, for example, by a worker operating a cutter or the like. A cutting tool that cuts the band-like member B may also be provided on the attaching device 1.

The bonding operation is performed in a state where the relative rotation of the tire T in the tire circumferential direction with respect to the holder 2 is stopped, and the dispensed portion Ba having a predetermined length is pressed by the paddle 3 and pressure-bonded to the inner surface Ta, so it is possible to press sufficiently without applying an extra tensile force to the dispensed portion Ba. Moreover, in the dispensing operation, the paddle 3 is moved away from the inner surface Ta, and by relatively rotating the tire T with respect to the holder 2 in the tire circumferential direction and by dispensing the band-like member B in the wound state toward the inner surface Ta, the new dispensed portion Ba having a predetermined length is formed, so it is possible to avoid applying an extra tensile force to the new dispensed portion Ba. Therefore, by repeatedly performing this bonding operation and the dispensing operation in an alternating manner, it is possible to firmly bond the band-like member B to the inner surface Ta while avoiding damage to the band-like member B.

The temperature control mechanism 9 may be optionally provided; however, when using the temperature control mechanism 9 to adjust the temperature of the inner surface Ta when the band-like member B is pressure-bonded to be no less than 10° C. and no greater than 40° C. (more preferably no less than 25° C. and no greater than 40° C.), the band-like member B may be more easily bonded to the inner surface Ta.

Figure 8:
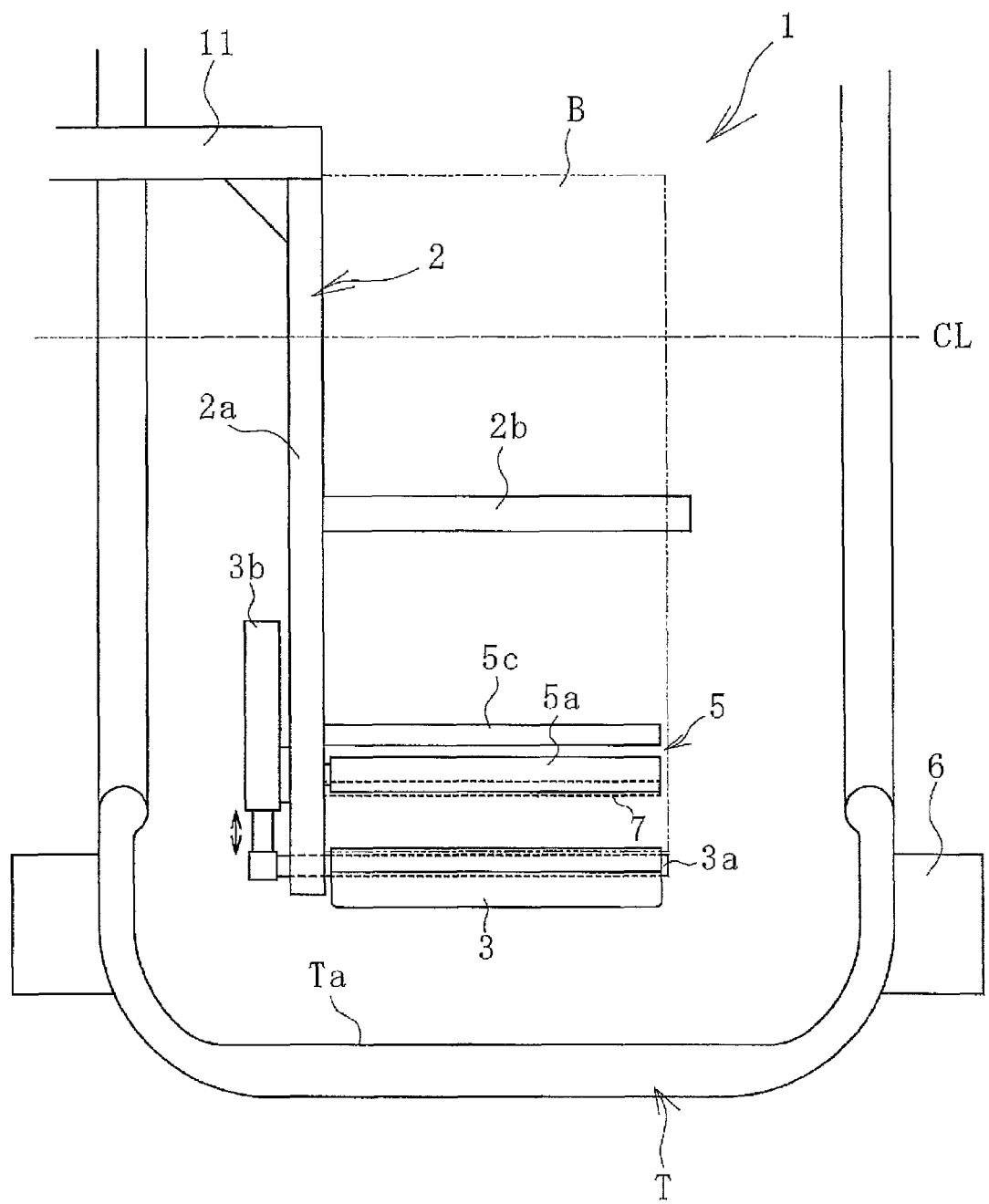
FIG. 8 is an explanatory diagram illustrating the inner portion of a tire in a tire front view and in which another embodiment of the attaching device is disposed.

The embodiment illustrated in FIG. 8 differs from the previous embodiment in the structure for moving the paddle 3 toward and away from the inner surface Ta.

In this embodiment, a movement mechanism 3b such as a fluid cylinder is provided on the holding plate 2a. The paddle 3 is moved toward or away from the inner surface Ta by the movement mechanism 3b. In FIG. 8, the band-like member B is illustrated by a two-dot chain line.

More specifically, one end portion of the paddle shaft 3a is connected to a rod of the movement mechanism 3b, and the paddle 3 moves up and down with the paddle shaft 3a due to the movement of the rod. When the paddle 3 moves downward, the paddle 3 moves closer toward the inner surface Ta, and when the paddle 3 moves upward, the paddle 3 moves away from the inner surface Ta. In other words, the paddle 3 moves toward or away from the inner surface Ta independent of the holder 2.

Figure 9:
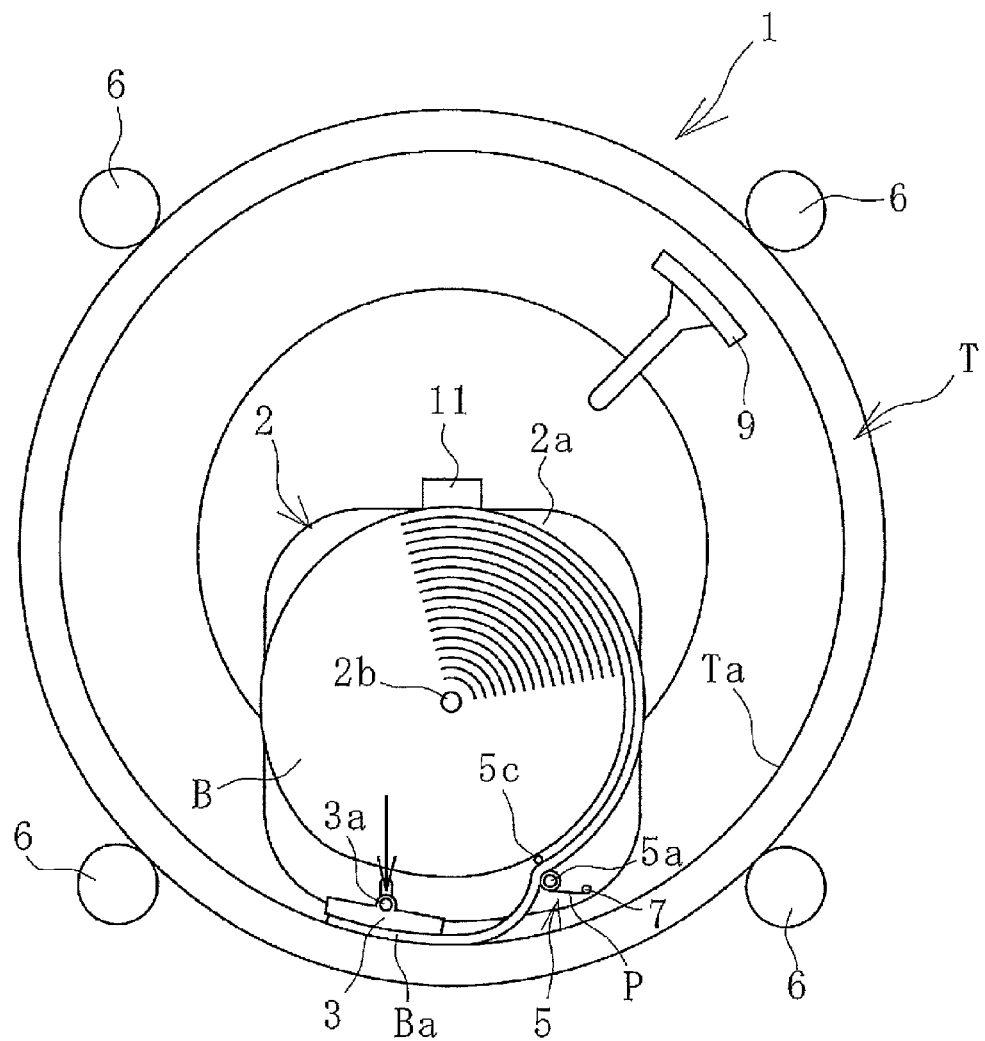
FIG. 9 is an explanatory diagram illustrating a bonding operation according to the embodiment in FIG. 8, in a side view of inside the tire.

As illustrated in FIG. 9, the bonding operation in this embodiment is performed in a state in which the relative rotation of the tire T in the tire circumferential direction with respect to the holder 2 disposed inside the tire T is stopped, as in the previous embodiment. However, with the holder 2 fixed at a predetermined vertical position inside the tire T, the paddle 3 is brought close to the inner surface Ta independently of the holder 2. Other configurations of this embodiment are substantially the same as in the previous embodiment. In this way, the dispensed portion Ba having a predetermined length that is dispensed from the band-like member B in a wound state toward the inner surface Ta is pressed by the paddle 3 and pressure-bonded to the inner surface Ta.

Figure 10:
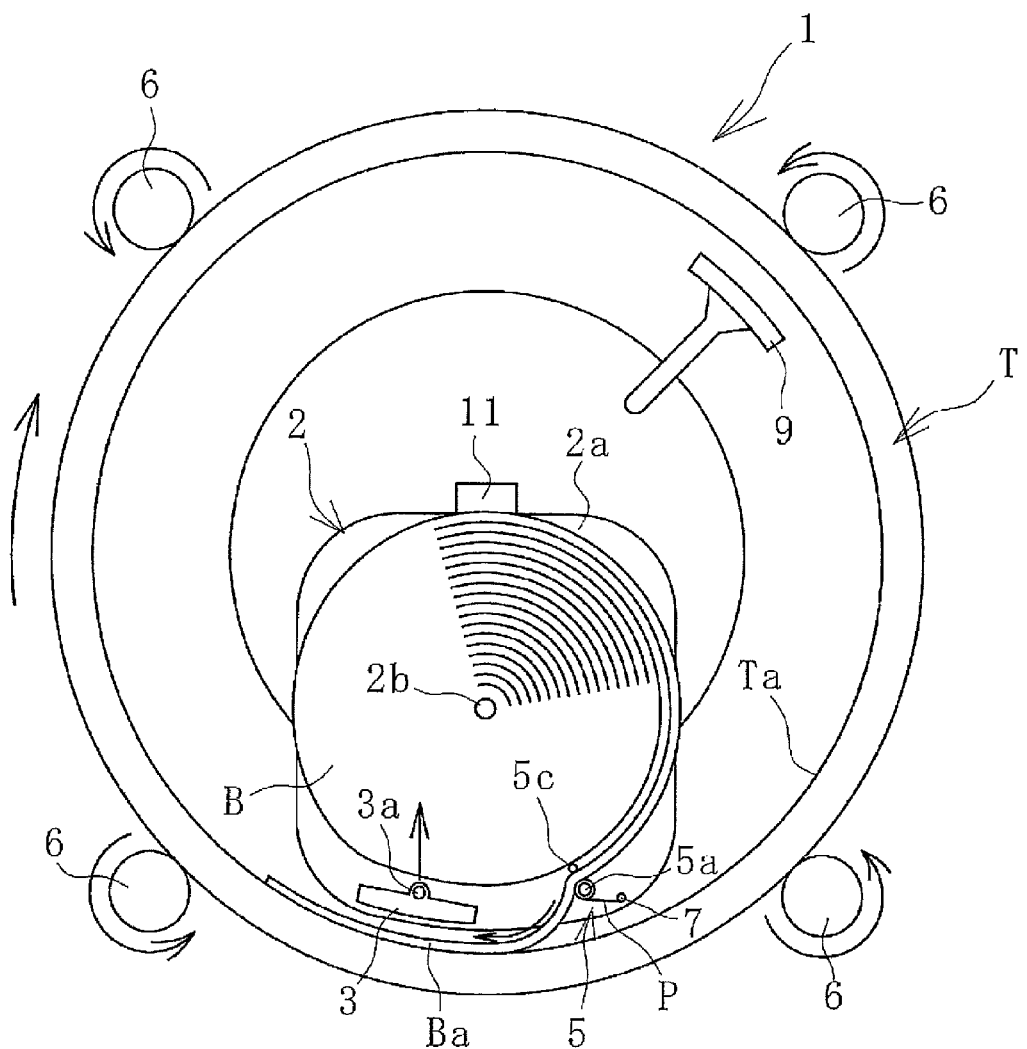
FIG. 10 is an explanatory diagram illustrating a dispensing operation performed after the bonding operation in FIG. 9.

Then, the dispensing operation illustrated in FIG. 10 is performed. In this embodiment, the paddle 3 is separated from the inner surface Ta independently of the holder 2 in a state where the holder 2 is fixed in a predetermined vertical position inside the tire T. Only this movement of the paddle 3 differs from the previous embodiment. The method of relatively rotating the tire T with respect to the holder 2 in the tire circumferential direction (one direction) and forming a new dispensed portion Ba having a predetermined length that is dispensed from the band-like member B in a wound state toward the inner surface Ta is substantially the same as in the previous embodiment.

In this way, the bonding operation and the dispensing operation are repeated, and the sequentially dispensed portion Ba having a predetermined length is pressure-bonded to the inner surface Ta. In this embodiment, the vertical position of the holder 2 may be set to the identical fixed position in the bonding operation and the dispensing operation, so the band-like member B can be more stably and easily attached to the inner surface Ta.

In any of the embodiments described above, a plurality of the band-like members B in a wound state may be arranged in parallel at intervals in the direction of the tire axis CL direction with a spacer interposed in the holding shaft 2b. In this way, the band-like member B having a desired width may be attached (pressure-bonded) to a desired position in the tire width direction on the inner surface Ta.

The present technology is not limited to a sound absorbing member and may be used when attaching other band-like members B.

The invention claimed is:

1. An attaching device for attaching a band-like member to a tire inner surface, comprising:
    a holder for holding the band-like member in a wound state;
    a support arm for disposing the holder inside a tire;
    a paddle that is disposed in an inner portion of the tire and that is configured to move toward and away from the tire inner surface;
    a delivery-driving unit configured to dispense the band-like member held by the holder toward the tire inner surface; and
    a rotation-driving unit configured to relatively rotate the tire in a tire circumferential direction with respect to the holder disposed in the inner portion of the tire,
    a dispensed portion sequentially dispensed and having a predetermined length being pressure-bonded to the tire inner surface by repeatedly performing:
    a bonding operation in which the dispensed portion of the predetermined length that is dispensed from the band-like member in the wound state toward the tire inner surface by the delivery-driving unit is pressed, by moving the paddle close to the tire inner surface in a state in which a relative rotation of the tire in the tire circumferential direction with respect to the holder is stopped, and is pressure-bonded to the tire inner surface; and
    a dispensing operation in which, after the bonding operation, the paddle is moved away from the tire inner surface, and together with relatively rotating the tire in the tire circumferential direction with respect to the holder by the rotation-driving unit, a new dispensed portion having a predetermined length and dispensed by the delivery-driving unit from the band-like member in the wound state toward the tire inner surface is formed.

2. The attaching device for attaching the band-like member to the tire inner surface according to claim 1, wherein the paddle is connected to the holder, and the holder and the paddle integrally move toward and away from the tire inner surface.

3. The attaching device for attaching the band-like member to the tire inner surface according to claim 1, wherein the paddle is configured to move toward and away from the tire inner surface independently of the holder.

4. The attaching device for attaching the band-like member to the tire inner surface according to claim 3, wherein the delivery-driving unit is a rotating body that rolls on an outer circumferential surface of the band-like member held by the holder.

5. The attaching device for attaching the band-like member to the tire inner surface according to claim 4, further comprising
    a temperature control mechanism for adjusting a temperature of the tire inner surface to no less than 10° C. and no greater than 40° C.

6. The attaching device for attaching the band-like member to the tire inner surface according to claim 1, wherein the delivery-driving unit is a rotating body that rolls on an outer circumferential surface of the band-like member held by the holder.

7. The attaching device for attaching the band-like member to the tire inner surface according to claim 1, further comprising a temperature control mechanism for adjusting a temperature of the tire inner surface to no less than 10° C. and no greater than 40° C.

8. A method for attaching a band-like member to a tire inner surface, comprising:
 disposing, using a support arm a holder that holds the band-like member in a wound state and a paddle that moves toward or away from the tire inner surface inside a tire; and
 pressure-bonding a dispensed portion sequentially dispensed, using a delivery-driving unit, and having a predetermined length to the tire inner surface by repeatedly performing:
 a bonding operation in which a dispensed portion of a predetermined length that is dispensed from the band-like member in the wound state toward the tire inner surface by the delivery-driving unit is pressed, by moving the paddle close to the tire inner surface in a state in which a relative rotation of the tire in a tire circumferential direction with respect to the holder disposed in an inner portion of the tire is stopped, and is pressure-bonded to the tire inner surface and
 a dispensing operation in which, after the bonding operation, the paddle is moved away from the tire inner surface, and together with relatively rotating the tire in the tire circumferential direction with respect to the holder, using a rotation-driving unit disposed in the inner portion of the tire, a new dispensed portion having a predetermined length and dispensed by the delivery-driving unit from the band-like member in the wound state toward the tire inner surface is formed.

* * * * *